United States Patent Office 3,523,792

Patented Aug. 11, 1970

3,523,792

PROCESS FOR THE PHOTOPOLYMERISATION OF ETHYLENICALLY UNSATURATED MONOMERS

Gerard Albert Delzenne and Urbain Leopold Laridon, Wilrijk, Belgium, assignors to Gevaert-Agfa N.V., Mortsel, Belgium, a Belgian company No Drawing. Filed July 3, 1967, Ser. No. 650,576
Claims priority, application Great Britain, Aug. 22, 1966, 37,585/66
Int. Cl. G03c *1/68*
U.S. Cl. 96—35.1 8 Claims

ABSTRACT OF THE DISCLOSURE

A process for the photopolymerisation of ethylenically unsaturated compounds by exposing to light radiation in the presence of an oxazirane compound and a light-sensitive iron(III) compound.

The photo-initiation of radical polymerisation reactions can be caused by a large number of photosensitive systems, the common feature of which is that, under the influence of light, they give rise directly or indirectly to the formation of free radicals.

By "direct systems" we understand systems in which the initiating radicals are formed as primary decomposition products during the photolysis of certain compounds under the influence of actinic light. These systems often have the disadvantage that they are also thermally active and that the radicals causing polymerisation can also be formed by simple heating.

By "indirect systems" we understand systems in which the radicals are formed only after absorption of light, by a secondary reaction. For instance, in the initiation system of Oster based on photo-reducible dyes, the radicals are formed only during the oxidation of the reduction products of the photo-excited dyes.

A process has now been found for the photopolymerisation of ethylenically unsaturated compounds by a redox initiation with an oxazirane compound as oxidizing agent and photolytically formed iron(II) ions as reducing agent, an iron(III) complex being used as photosensitive element.

According to the invention a process is provided for the photopolymerisation of polymerisable ethylenically unsaturated monomers, which process comprises subjecting said monomer or mixture of monomers to light radiation of wave-lengths in the range of 2500–5000 A. in the presence of a light-sensitive iron(III) complex and of an oxazirane compound of the formula:

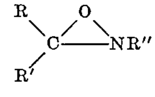

wherein

R represents a hydrogen atom,
R′ represents a phenyl group, or an alkyl group of 1 to 3 carbon atoms,
or wherein R and R′ together with the carbon atom form a cycloaliphatic group;
and wherein R″ represents an alkyl group of 1 to 4 carbon atoms.

These oxaziranes can be obtained by treating Schiff's bases with peracids (see Krimm: Chemische Berichte, 91, 1057 (1958).

Examples of suitable oxaziranes are:

2-t-butyl-3-phenyloxazirane
2-t-butyl-3-isopropyloxazirane
2-ethyl-3-pentamethyleneoxazirane.

Examples of light-sensitive iron(III) complexes that have been found suitable for practising the invention are:

ammonium iron(III) acetate
ammonium iron(III) citrate
ammonium iron(III) oxalate
potassium iron(III) citrate
potassium iron(III) oxalate
potassium iron(III) sulphate
potassium iron(III) tartrate.

The process of the invention is applied to the photopolymerisation of compositions comprising ethylenically unsaturated organic compounds. These compositions may comprise one or more ethylenically unsaturated polymerisable compounds such as styrene, acrylamide, methacrylamide, acrylic acid, methyl methacrylate, acrylonitrile, N - vinyl - phthalimide, N - vinyl - pyrrolidone, vinyl esters and vinyl ethers. When two of these monomers are used in the same photopolymerisation composition or if they are mixed with other polymerisable compounds, copolymers are formed during the photopolymerisation. It is further presumed that in the case where the photopolymerisable material is used together with a polymeric binding agent as will be indicated hereinafter, graft copolymers are formed between the polymeric binder and the photopolymerised material.

The photopolymerisable composition may also comprise or consist of unsaturated compounds having more than one carbon-to-carbon double bond, e.g., two terminal vinyl groups, or of a polymeric compound having ethylenic unsaturation. During polymerisation of these compositions cross-linking will usually occur by means of the plurally unsaturated compound. Examples of compounds containing more than one carbon-to-carbon double bond are, e.g., divinylbenzene, diglycol diacrylates and N,N′-alkylene - bis - acrylamides. Examples of polymeric compounds containing ethylenically unsaturation are, e.g., allyl esters of polyacrylic acid, maleic esters of polyvinyl alcohol, polyhydrocarbons still containing carbon-to-carbon double bonds, unsaturated polyesters, cellulose acetomaleates and allycellulose.

The quantity of iron(III) complex used to initiate polymerization of the monomer or monomers is not critical and may vary within wide limits. It has been found that in general satisfactory results are obtained if the proportion of iron(III) ion to monomer is comprised between 1:1000 and 1:50.000.

The quantity of oxazirane compounds present is more critical. Up to a certain level an increasing of the rate of oxazirane compound results in an increasing of the polymerisation rate. In general, however, it is seldom necessary to employ more than 0.02% by weight of oxazirane compound relative to the weight of monomer present for obtaining a good polymerisation rate.

The ethylenically unsaturated organic compounds may be exposed to any source of radiation providing radiation of the wavelength region of 2500 to 5000 angstroms, preferably of the wavelength region of 3000 to 4500 anstroms. With certain iron(III) complexes having a higher absorption maximum it is even possible to use radiations of wavelengths above 5000 angstroms. Suitable light sources include carbon arcs, mercury vapour lamps, flourescent lamps, argon glow lamps, photographic flood lamps and tungsten lamps. Moreover, ordinary daylight may be used too.

The photopolymerisation can be carried out by any of the well-known processes, such as bulk, emulsion, suspension and solution polymerisation processes. In all of these processes, the addition of an iron(III) complex and of an oxazirane compound according to the invention to polymerisable materials subjected to the action of actinic light greatly increases the rate of photopolymerisation.

A base or support may be coated with a solution of the ethylenically unsaturated organic compound in a solvent therefor, this solution containing in dissolved state or homogeneously dispersed therein an iron(III) complex and an oxazirane compound, whereupon the solvent or solvent mixture is eliminated by known means such as evaporation, leaving a more or less thin coating of the ethylenically unsaturated organic compound on the base or support. Thereafter the dried photopolymerisable coating is exposed to actinic light rays. Suitable bases or supports are paper, cellulose triacetate films, polyethylene terephthalate films, metal plates such as of zinc, aluminium and copper.

In some instances it may be desirable that the photopolymerisable composition comprises a hydrophilic or hydrophobic colloid as carrier or binding agent for the ethylenically unsaturated organic compound and the photopolymerisation initiating mixture of iron(III) complex and of oxazirane compound. By the presence of this binding agent the properties of the light-sensitive layer are of course highly influenced. The choice of the binding agent is dependent on its solubility in solvents, which can also be used as solvents for the ethylenically unsaturated organic compounds and for the iron(III) complex and the oxazirane compound of the invention. Such binding agents are for instance poly(styrene), poly(methylmethacrylate), poly(vinyl acetate), poly(vinyl butyral), partially saponified cellulose acetate and other polymers that are soluble in solvents for initiators and monomers. In some instances water-soluble polymers can be used such as gelatin, casein, starch, carboxumethylcellulose and poly(vinyl alcohol). It is evident that the ratio of photopolymerisable composition to binding agent also influences the photopolymerisation. The larger this ratio, the higher the photopolymerisation rate generally will be for one and the same ethylenically unsaturated organic compound.

If the photopolymerisable composition is water-soluble water may be used as solvent for coating the support. On the contrary, if water-insoluble photopolymerisable compositions are used, organic solvents, mixtures of organic solvents or mixtures of organic solvents and water may be used.

In the photopolymerization of ethylenically unsaturated compounds with iron(III) complexes and oxazirane compounds of the invention high temperatures are not required. The exposure, however, to strong light sources, at a relatively short distance, brings about a certain heating of the mass to be polymerised, which heating exercises a favourable influence upon the polymerisation rate.

According to a very interesting and most preferable embodiment of the invention a solution of the monomer or monomers having dissolved or dispersed therein the iron(III) complex is coated on a suitable support and the solvent is eliminated. The dried layer is exposed to actinic light. In order to start polymerisation, at any time after the exposure to light, the exposed layer is treated with a solution of the oxzirane compound.

The photopolymerisable compositions, which contain iron(III)-complexes and oxazirane compounds, are useful in the preparation of photographic images.

The present invention comprises spreading the polymerisable composition upon a surface such as a surface of metal and printing a design thereon photographically by exposure to light through a suitable image pattern. Hereby the light induces polymerisation in the exposed areas of the photopolymerisation composition whereby the polymeric layer is rendered insoluble in the solvent or solvents used for applying the photopolymerisable layer. Thereafter the nonexposed areas are washed away with a solvent for the monomeric material.

In the special and most preferable way for the application of the process of the invention, which has been indicated above, a solution of the polymerisable composition comprising monomer, iron(III) complex and occasionally a binding agent is spread on a surface and the dried layer is exposed photographically through a suitable image pattern. Thereupon the exposed layer is treated with a solution of the oxazirane compound, whereupon polymerisation starts in the exposed areas of the photopolymerisation composition. The nonexposed areas can be washed away with a solvent for the monomeric material.

In both processes relief printing plates and photographic resist images are manufactured, which can be further used as planographic printing plates, as stencils for silk screen printing, as photoresists and as printed circuits.

When using water-permeable colloids as binding agent it is evident that the invention can be applied for the preparation of etching resists for conventional gravure. However, when water-impermeable colloids are used etching resists can be made as used for inverted halftone gravure.

The image-wise photopolymerisation can also induce differential softening properties to the layer. This makes possible a reproduction process by material transfer when the image-wise photopolymerised layer is subsequently warmed up and pressed against a receiving sheet, so that the softened areas are transferred to the receiving sheet.

The following examples illustrate the present invention.

EXAMPLE 1

A cylindrical curvette comprises an aqueous solution containing per litre:

1.41 g. of 2-ethyl-3-pentamethylene oxazirane,
0.437 g. of potassium iron(III) oxalate, and
71 g. (1 mole) of acrylamide.

The solution is exposed by means of a 140-watt mercury vapour lamp placed at a distance of 20 cm. After an exposure time of 1 minute polymerisation starts. Yield of polymer: about 13%/min.

EXAMPLE 2

The process of Example 1 is repeated with the difference, however, that the concentration of acrylamide in the aqueous solution is increased to 4 moles/litre or 284 g./litre. Exposure occurs in the same way. In this case, too, polymerisation starts after 1 minute. Yield of polymer: 16%/min.

EXAMPLE 3

A mixture of water and ethylene glycol monomethyl ether (60:40% by volume) comprises 0.142 g./litre of 2-t-butyl-3-isopropyl oxazirane and 0.437 g./litre of potassium iron(III) oxalate, together with 4 moles/litre or 284 g./litre of acrylamide. The pH of the solution is adjusted to pH 5 by means of a mixture of 0.06 N of acetic acid and 0.14 N of sodium acetate. Exposure occurs as in Example 1. After an exposure time of 2 minutes polymerisation starts. Yield of polymer: about 6%/min.

EXAMPLE 4

A mixture of water and ethylene glycol monomethyl ether (60:40% by volume) comprises 0.142 g./litre of 2-t-butyl-3-isopropyl oxazirane and 2.8 moles/litre or 198.8 g./litre of acrylamide together with 2.185 g./litre of potassium iron(III) oxalate. Exposure occurs as in example 1 and polymerisation starts after 2½ min. Yield of polymer: 8%/min.

EXAMPLE 5

The process of Example 4 is repeated with the difference, however, that the concentration of 2-t-butyl-3-isopropyl oxazirane is increased to 1.42 g./litre. Exposure occurs as in Example 1 and the polymerisation starts after 1 minute. Yield of polymer: about 25%/min.

EXAMPLE 6

In order to examine the influence of the light intensity on the polymerisation rate the following test is made.

An aqueous solution comprising 2.8 moles/litre or 198.8 g./litre of acrylamide, 0.71 g./litre of 2-t-butyl-3-isopropyl oxazirane and 0.437 g./litre of potassium iron (III) oxalate is exposed as described in Example 1, using however, different density filters during the exposure. The following results are obtained:

| Light intensity, percent | Polymerisation starts after— | Yield of polymer in percent/min. |
|---|---|---|
| 100 | 1 min | 22 |
| 50 | 5 min | 16 |
| 20 | 5½ min | 10 |
| 10 | 9 min | 7.35 |

EXAMPLE 7

A mixture of water and ethylene glycol monomethyl ether (60:40) the pH of which has been adjusted to pH 5 by means of a mixture of 0.06 N of acetic acid and 0.14 N of sodium acetate comprises 200 g./litre of triethylene glycol diacrylate, 0.22 g./litre of potassium iron (III) oxalate and 0.715 g./litre of 2-t-butyl-3-isopropyl-oxazirane. 10 ccs. of the solution obtained are exposed in a test tube by means of a 330-watt high pressure mercury vapour lamp placed at a distance of 18 cm. After an exposure time of 15 min. a voluminous precipitate forms which is washed with ethanol and dried. Yield of polymer: 83%.

EXAMPLE 8

A mixture of water and ethylene glycol monomethyl ether (60:40) the pH of which has been adjusted to pH 5 by means of a mixture of 0.06 N of acetic acid and 0.14 N of sodium acetate comprises 200 g./litre of acrylonitrile, 0.22 g./litre of potassium iron(III) oxalate and 0.715 g./litre of 2-t-butyl-3-isopropyl-oxazirane.

10 ccs. of the solution obtained are exposed as described in Example 7 in a test tube. After 15 min. a precipitate is formed that is separated, washed, and dried. Yield of polymer: 17%.

EXAMPLE 9

A mixture of water and ethylene glycol monomethyl ether (25:75) the pH of which has been adjusted to pH 5 by means of a mixture of 0.06 N of acetic acid and 0.14 N of sodium acetate comprises 50 g./litre of N-vinyl phthalimide, 0.22 g./litre of potassium iron(III) oxalate and 0.715 g./litre of 2-t-butyl-3-isopropyl-oxazirane.

10 ccs. of the solution obtained are exposed in a test tube as described in Example 7 with the difference, however, that first the oxygen is removed from the test tube by introducing nitrogen. Yield of polymer: 48%.

EXAMPLE 10

A mixture of water and ethylene glycol monoethyl ether (60:40) the pH of which has been adjusted to pH 5 comprises 200 g./liter of acrylic acid, 0.22 g./liter of potassium iron (III) oxalate and 0.715 g./liter of 2-t-butyl-3-isopropyloxazirane.

Exposure occurs as in Example 7. After 15 min. the solution becomes viscous. Yield of polymer: 50–60%.

EXAMPLE 11

23 g. of gelatin are dissolved in 95 ccs. of water at 45° C. Then 6 g. of acrylamide and 1.5 g. of N,N'-methylene-bis-acrylamide dissolved in 30 ccs. of water are added. To the solution obtained are added successively:

1.6 g. of 2-ethyl-3-pentamethylene oxazirane,
10 ccs. of a 6% aqueous suspension of Litholscharlach BBM Pigmosol of Badische Anilin- & Soda-Fabrik (Colour-Index 15.865),
12 ccs. of a 5% aqueous solution of ammonium iron(III) citrate, and
1 cc. of sodium tetradecylsulphate as moistening agent.

The solution is coated onto a subbed polyethylene terephthalate film pro rata of 30 g. of solids/sq.m.

The dried layer is exposed for 95 sec. through a grey-wedge having a constant of 0.15 by means of an arc lamp of 140 amp. placed at a distance of 1 m. The light intensity in the copying areas is 22000 lux ± 1000 lux.

After the exposure the film material is washed in warm water of 40–45° C. The relief image obtained covers 3 steps. When the exposure takes place through a photographic line original a negative relief image of the original is obtained which can be used as printing plate.

EXAMPLE 12

Example 11 is repeated with the difference, however, that in the composition of the layer the oxazirane compound is replaced by water.

The film material obtained is divided into four strips and each of these strips is exposed in the same way as described in Example 11.

Before development the strips of film are dipped for 1 min. in one of the following solutions respectively:

(a) a 0.03% aqueous solution of hydrogen peroxide (strip A)
(b) a 0.03% aqueous solution of hydrogen peroxide (strip B)
(c) a 0.1% solution of 2-ethyl-3-pentamethylene oxazirane in a 10% aqueous solution of methyl glycol (strip C)
(d) a 1% solution of 2-ethyl-3-pentamethylene oxazirane in a 10% aqueous solution of methyl glycol (strip D).

Then the strips of film are washed in warm water.

The number of steps of the grey-wedge are:

for strip A: 6
for strip B: 8
for strip C: 5
for strip D: 8.

What we claim is:

1. Process for the photopolymerisation of polymerisable ethylenically unsaturated monomers, which process comprises subjecting said monomer or mixture of monomers to light radiation of wavelengths in the range of 2500–5000 angstroms in the presence of a light-sensitive iron(III) compound and of an oxazirane compound of the formula:

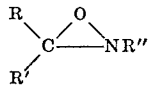

wherein
R is hydrogen,
R' is a phenyl group or an alkyl group of 1 to 3 carbon atoms,
or wherein R and R' together with the carbon atom form a cycloaliphatic group,
and wherein R'' represents an alkyl group of 1 to 4 atoms.

2. Process according to claim 1 wherein the iron(III) complex is ammonium iron(III) citrate.

3. Process according to claim 1 wherein the iron(III) complex is ammonium iron(III) oxalate.

4. Process according to claim 1, wherein the oxazirane compound is 2-t-butyl-3-phenyl-oxazirane.

5. Process according to claim 1, wherein the oxazirane compound is 2-t-butyl-3-isopropyl-oxazirane.

6. Process according to claim 1, wherein the oxazirane compound is 2-ethyl-3-pentamethylene-oxazirane.

7. Process for producing photographic printing plates and etching resists which comprises exposing to a pattern of light radiation of 2500–5000 angstroms, a photographic element comprising a support and a light-sensitive layer comprising dispersed in a colloidal carrier a polymerisable ethylenically unsaturated monomer, a light-sensitive iron(III) compound and an oxazirane compound of the formula:

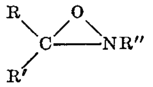

wherein
R is hydrogen
R′ is a phenyl group or an alkyl group of 1 to 3 carbon atoms, or wherein R and R′ together with the carbon atom form a cycloaliphatic group,
and wherein R″ represents an alkyl group of 1 to 4 atoms, whereby in said layer said polymerisable ethylenically unsaturated monomer is polymerised according to said pattern of light radiation, and washing away the residual unpolymerised monomer to leave a polymerised photographic relief image of said pattern of light radiation.

8. Process according to claim 7, wherein the colloidal carrier is gelatin.

References Cited

UNITED STATES PATENTS

| | | | |
|---|---|---|---|
| 3,101,270 | 8/1963 | Evans et al. | 96—115 XR |
| 3,136,638 | 6/1964 | Schwerin et al. | 96—75 |
| 3,157,501 | 11/1964 | Burrows et al. | 96—115 XR |
| 3,183,094 | 5/1965 | Cerwonka et al. | 96—115 XR |

RONALD H. SMITH, Primary Examiner

U.S. Cl. X.R.

96—115; 204—159.24